Patented Sept. 12, 1950

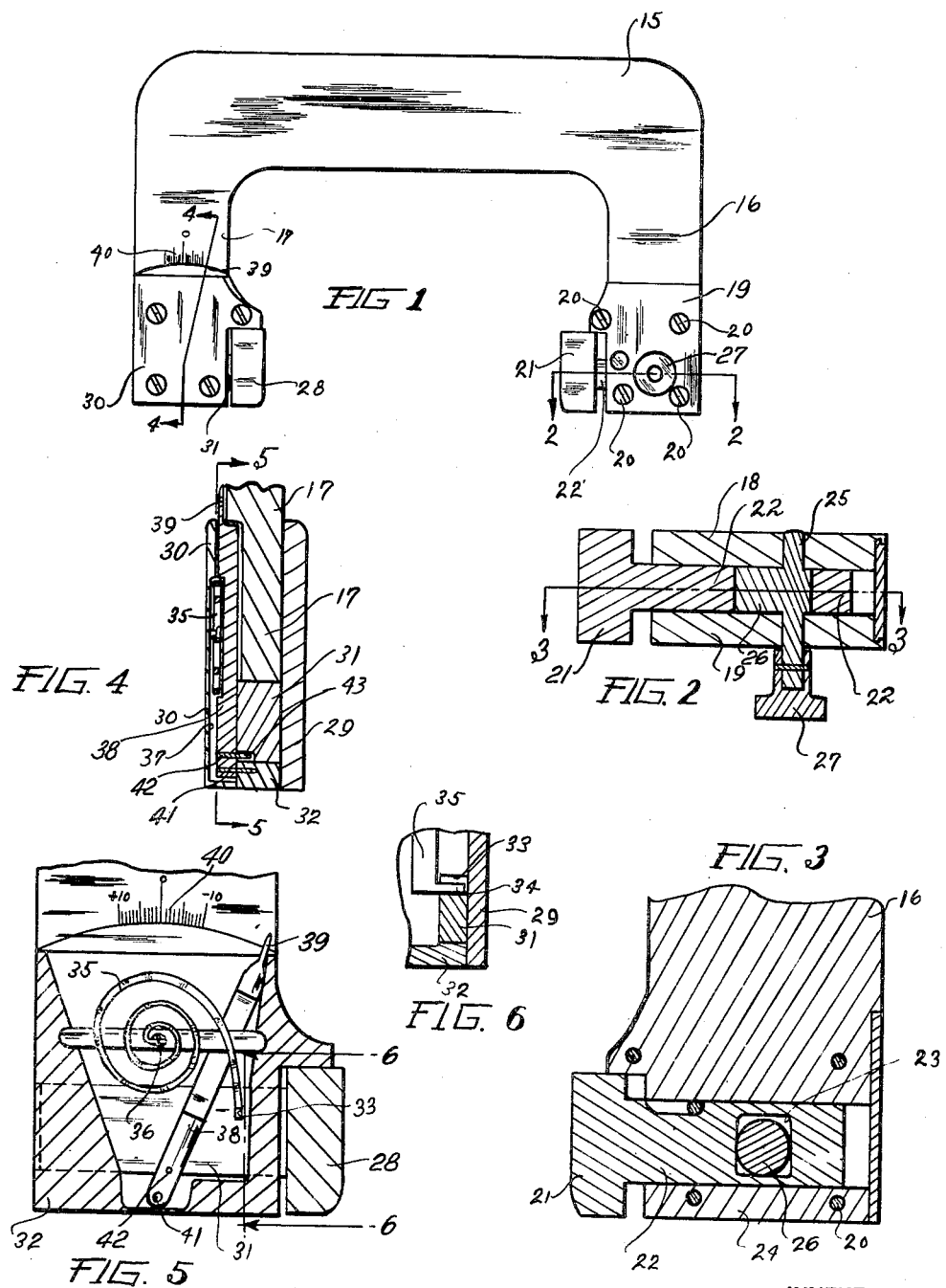

2,521,883

UNITED STATES PATENT OFFICE 2,521,883

VARIABLE SNAP GAUGE

Andrew P. Teevin, Detroit, Mich.

Application December 26, 1944, Serial No. 569,824

1 Claim. (Cl. 33—147)

My invention relates to a new and useful improvement in a variable snap gauge adapted for use in gauging external surfaces, slots, radii and also in checking threads.

It is an object of the present invention to provide a variable snap gauge which will be simple in structure, easily and quickly adjusted, sensitive in its measurements and yet possessed of strength.

Another object of the invention is the provision of a variable snap gauge which may be economically manufactured, possessed of a minimum number of parts, and of simple construction.

Another object of the invention is the provision of a variable snap gauge in which variations may be easily and quickly indicated and noted.

Other objects will appear hereinafter. It is recognized that various modifications and changes may be made in the detail of structure illustrated without departing from the invention and it is intended that such variations and changes shall be embraced within the scope of the present application.

Forming a part of this specification are drawings in which:

Fig. 1 is a side elevational view of the invention,

Fig. 2 is a slightly enlarged, sectional view taken on line 2—2 of Fig. 1,

Fig. 3 is a slightly enlarged, sectional view taken on line 3—3 of Fig. 2,

Fig. 4 is a slightly enlarged, sectional view taken on line 4—4 of Fig. 1,

Fig. 5 is a view taken on line 5—5 of Fig. 4,

Fig. 6 is a fragmentary sectional view taken on line 6—6 of Fig. 5 with parts removed.

The invention comprises a supporting head which I have illustrated as being formed U-shaped or the form of a yoke comprising a gripping portion 15 and spaced apart legs 16 and 17. Carried by the leg 16 are the spaced apart plates 18 and 19 suitably secured together and to the leg 16 by the screws 20. A contact head 21 is provided with a stem 22 in which is formed an opening 23. This stem is slidably projected between the plates 18 and 19 which are spaced apart at their lower ends by the spacing block 24. A rod 25 is projected through the plates 18 and 19 and journalled thereon. Fixedly mounted on this rod 25 or formed integral therewith is a cam disc 26 which engages in the opening 23. A head 27 serves as a means for rotating the rod or pin 25 so that the head 21 may be moved toward or away from the leg 17.

A contact head 28 is provided with a stem 31 slidably projected between the plates 29 and 30 which are mounted on the lower end of the leg 17. A spacer block 32 serves to space the plates 29 and 30 apart. The stem 31 is provided with a slot 33 in which the angularly turned end 34 of the spring 35 engages, the opposite end of the spring 35 being attached by the screw 36 to the plate 30. This plate 30 is provided with a recess 37 in which engages a pointer 38 having a thin portion 39 which serves as an indicator and which projects outwardly beyond the upper end of the plate 30 to indicate on the graduations 40 which are formed on the face of the leg 17. The member 38 is pivoted at 41 to the spacer block 32. A pin 42 carried by the pointer 38 engages in a recess 43 formed in the stem 31 so that as the stem 31 is moved inwardly or outwardly the member 38 will be rocked on its pivot 41 against the compression of the spring 35.

The construction is such that the head 21 may be moved inwardly or outwardly of the leg 16 to the proper size and this is generally accomplished by placing the device on a master in order that the adjustment may be brought to the proper size. By then placing the structure over the material to be measured the contacting heads 21 and 28 will engage the periphery or external surface of the body to be measured and variations in the external dimensions will be indicated by a movement of the pointer 39. It is believed obvious that the invention is one which is possessed of a minimum number of parts and that it may be constructed in a durable manner.

Experience has shown that it is highly efficient in use and particularly desirable due to the fact that it may be readily and easily adjusted by rotating the cam 26.

What I claim as new is:

In a variable snap gauge for measuring external distances, a yoke-shaped body having a gripping portion and a pair of parallel extending legs, one of said legs having a recess and provided with a transversely extending passage traversing said recess at one side; a contact head; a stem on said head slidably projected into said passage, said head being movable toward and away from said leg upon sliding of said stem in said passage; a spring in said recess and secured at one end to said leg and at the opposite end to said stem for normally urging said stem outwardly of said passage and resisting movement of said head toward said leg; a pointer projected at one end into said recess and extending at its opposite end beyond said recess; a pin for pivoting the projected end of said pointer to said leg at a point below the lower side of said stem, said stem having a recess formed in its lower side; a pin projecting outwardly from said pointer above the point of pivot thereof and engaging in the recess in said stem, for rocking said pointer on its pivot upon sliding movement of said stem.

ANDREW P. TEEVIN.

REFERENCES CITED

The following references are of record in the file of this patent:

UNITED STATES PATENTS

| Number | Name | Date |
|---|---|---|
| 1,394,974 | Danielson | Oct. 25, 1921 |
| 1,409,870 | Lauer | Mar. 14, 1922 |
| 1,414,484 | Olsen | May 2, 1922 |
| 1,436,656 | Horstmann et al. | Nov. 28, 1922 |
| 1,448,373 | Bartholdy | Mar. 13, 1923 |
| 1,529,650 | Darlington | Mar. 17, 1925 |

FOREIGN PATENTS

| Number | Country | Date |
|---|---|---|
| 58,954 | Australia | May 10, 1913 |
| 113,230 | Germany | Sept. 11, 1900 |
| 480,843 | Great Britain | Mar. 1, 1938 |